United States Patent
Dorner et al.

(10) Patent No.: US 11,493,724 B2
(45) Date of Patent: Nov. 8, 2022

(54) LENS HOLDER FOR DIP COATING

(71) Applicant: Rodenstock GmbH, Munich (DE)

(72) Inventors: Christian Dorner, Zwiesel (DE); Alexander Ebner, Achslach (DE); Florian Schrettle, Deggendorf (DE)

(73) Assignee: Rodenstock GmbH, Munich (DE)

( * ) Notice: Subject to any disclaimer, the term of this patent is extended or adjusted under 35 U.S.C. 154(b) by 267 days.

(21) Appl. No.: 16/619,275

(22) PCT Filed: Apr. 10, 2018

(86) PCT No.: PCT/EP2018/059127
§ 371 (c)(1),
(2) Date: Dec. 4, 2019

(87) PCT Pub. No.: WO2018/224202
PCT Pub. Date: Dec. 13, 2018

(65) Prior Publication Data
US 2020/0142148 A1   May 7, 2020

(30) Foreign Application Priority Data
Jun. 8, 2017 (DE) .......................... 102017005473.8

(51) Int. Cl.
*G02B 7/02* (2021.01)
*G02B 1/10* (2015.01)
(Continued)

(52) U.S. Cl.
CPC .................. *G02B 7/02* (2013.01); *B05C 3/10* (2013.01); *B05C 13/025* (2013.01); *B05D 1/18* (2013.01);
(Continued)

(58) Field of Classification Search
None
See application file for complete search history.

(56) References Cited

U.S. PATENT DOCUMENTS

2002/0150832 A1* 10/2002 Kinoshita ................. B05C 3/09
427/430.1
2010/0107752 A1* 5/2010 Fernando ................. G01F 23/20
73/866
(Continued)

FOREIGN PATENT DOCUMENTS

| EP | 1914579 A1 | 4/2008 |
|----|------------|--------|
| JP | 2003071650 A | 3/2003 |

(Continued)

OTHER PUBLICATIONS

European Patent Office, International Search Report issued for PCT/EP2018/059127, 6 pgs., dated Jun. 29, 2018.
(Continued)

*Primary Examiner* — Jethro M. Pence
(74) *Attorney, Agent, or Firm* — Banner & Witcoff Ltd.

(57) ABSTRACT

Lens holding device holding an optical lens at its edge during a dip coating in a dip coating bath. First elastic lens holder having first lens edge holder holds the optical lens at a right edge of the optical lens, second elastic lens holder with second lens edge holder holds the optical lens at a left edge of the optical lens, and a circumferential frame with a third lens edge holder holds the optical lens at a lower edge of the optical lens. The circumferential frame has first and second lateral frame portions such that when the lens holder is raised out of the dip coating bath, waves caused at a surface of the dip coating bath are damped by the right or left lens edge holder, respectively.

16 Claims, 5 Drawing Sheets

(51) Int. Cl.
*B05C 13/02* (2006.01)
*B05C 3/10* (2006.01)
*B05D 1/18* (2006.01)
*B05D 5/06* (2006.01)
*B23Q 3/18* (2006.01)

(52) U.S. Cl.
CPC .............. *B05D 5/06* (2013.01); *B23Q 3/186* (2013.01); *G02B 1/10* (2013.01)

(56) References Cited

U.S. PATENT DOCUMENTS

| | | |
|---|---|---|
| 2010/0275839 A1 | 11/2010 | Velasquez et al. |
| 2013/0235482 A1* | 9/2013 | Gehrig .................... G02B 7/02 359/819 |
| 2013/0242418 A1 | 9/2013 | Gehrig et al. |

FOREIGN PATENT DOCUMENTS

| | | | |
|---|---|---|---|
| JP | 2003236447 A * | 8/2003 | ............ B05C 13/00 |
| JP | 2013-25455 A | 2/2013 | |
| JP | 2014-508957 A | 4/2014 | |
| JP | 2016-215201 A | 12/2016 | |
| KR | 10-0468236 B | 1/2005 | |
| WO | WO-2012/069757 A2 | 5/2012 | |

OTHER PUBLICATIONS

Office Action dated Dec. 3, 2021 for Japanese Patent Application No. 2019-567560.

* cited by examiner

LENS HOLDER FOR DIP COATING

TECHNICAL FIELD

The present disclosure relates to a lens holding device for holding an optical lens at its edge, during a dip coating in a dip coating bath, said lens holding device being improved in particular with regard to an achievable optical coating layer quality; and to a method for dip coating an optical lens in a dip coating bath by means of such a lens holding device. The disclosure can be used for optical lenses, in particular for spectacles lenses.

BACKGROUND

Dip coatings are very common in order to coat optical lenses, in particular spectacles lenses. During a dip coating, an optical lens is dipped into and out of a liquid dip coating solution or a dip coating bath, whereby the optical lens is wetted by the dip coating solution. The liquid coating layer of the optical lens is subsequently subjected to a drying or curing process, whereby a solid coating layer is created on the surface of the optical lens. Optical lenses may hereby be provided with a functional layer, for example with a hard protective layer, a coloration layer, and/or a mirroring or anti-reflection coating.

Due to the use of the optical lenses as optical elements, it is important to ensure an optimally homogeneous and defect-free coating layer. Defects in the coating layer may occur due to the handling of the optical lenses during and after a dip coating, and have a negative influence on the optical properties of the optical lens. Therefore, it has become a typical practice to clamp an optical lens in a lens holder before a dip coating, whereby a further handling of the optical lens is possible in particular during and after a dip coating, wherein the optical lens is held only at a few retention points, preferably at the edge or in proximity to the edge. Defects in the coating layer may thereby be avoided or reduced, at least in an optically relevant region of the optical lens. In the sense of the disclosure, the optically relevant region thereby means that region of the optical lens that should be preserved for embedding in the spectacles frame. In particular, the optically relevant region may have a defect-free zone as defined by internal standards of the lens manufacturer.

Beyond the selective freedom from defects, the homogeneity of the coating layer also represents an important quality criterion. The lens holder according to the disclosure may thereby also be used in order to be dipped into the dip bath and out of the dip bath again, in particular automatically by means of a corresponding dipping device, and in particular with optimally controlled and reproducible (for example constant) velocity.

SUMMARY

The object of the present disclosure is to provide an improved optical coating layer quality of an optical lens.

In one aspect, the disclosure thus offers a lens holding device for holding an optical lens at its edge, during a dip coating in a dip coating bath. The lens holding device thereby comprises a first elastic lens holding unit with a first lens edge holding element for holding the optical lens at an edge of said optical lens, on a first edge side, during the dip coating. Moreover, the lens holding device comprises a second elastic lens holding unit having a second lens edge holding element for holding the optical lens at the edge of said optical lens, on a second edge side, during the dip coating. The first edge side and the second edge side are thereby respectively arranged on a left side or, respectively, a right side of the edge of the optical lens.

Finally, the lens holding device comprises an at least partially circumferential frame having a third lens edge holding element to hold the optical lens at the edge of said optical lens during the dip coating, wherein the third edge side is arranged on a lower side of the edge of the optical lens; and wherein the at least partially circumferential frame has a first lateral frame portion and a second lateral frame portion, in particular with a first distance between the first lens edge holder element and the first lateral frame portion, and a second distance between the second lens edge holder element and the second lateral frame portion, such that waves that are caused on the surface of the dip coating bath by the respective first or second lens edge holder element upon raising the lens holding device out of said dip coating bath are damped. In particular, a homogeneity of the coating layer is increased via the damping of the waves on the surface of the dip coating bath, whereby the optical quality of the coating layer is improved.

Within the scope of the present disclosure, it has thus been recognized that waves on the surface of the dip coating bath may cause a non-uniform coating of the optical lenses. Most of all, it has turned out that such waves during the emergence of the optical lens out of the dip coating bath may lead to the situation that, locally, either more dip coating is stripped off the optical lens or more dip coating is applied onto the optical lens. In particular, it has been recognized that even small waves, which may be caused upon the emergence of lateral lens edge holding elements in particular out of the dip coating bath, may limit the optical quality of the coating layer. On the other hand, however, the inventors have recognized that lateral frame segments may be very efficiently used to damp such waves at the surface of the dip coating bath, and that this noticeably influences the resulting optical quality of the coating layer.

The first and second elastic lens holding unit allow a clamping and unclamping of the optical lens in the lens holding device, wherein the optical lens is respectively held from the direction of the left and right side. The first and second elastic lens holding unit are thereby designed such that a lower side, in particular a lower or lowermost point, of the held optical lens is essentially held by the third lens edge holding element. The lower side, in particular a lower or lowermost point, of the held optical lens is in this sense the side or the point of the optical lens that emerges from the dip bath solution as a last side or last point of the optical lens upon emerging. In this sense, what are to be understood by "essentially" are conventional deviations due to manufacturing and usage. It is hereby ensured in particular that draining dip coating solution may be carried away from the optical glass by the third lens edge holding element. In instances in which the dip coating solution is not drained from the optical lens, this may lead to an accumulation of the dip coating solution on the lower side of the optical lens, whereby a coating bead is created.

The optical lens is held in the lens holding device by the first and second lens holding unit having respectively the first and second lens edge holding element, and the third lens edge holding element. The lens edge holding elements may thereby be designed such that a contact surface between lens edge holding element and the optical lens is minimized, since such a contact surface negatively affects the coating layer that is to be formed in a region of the contact surface. In particular, the lens edge holding element may be designed to contact the optical lens only along the lens edge in order to thus not negatively affect an optically relevant front and back surface of the optical lens. In a preferred embodiment, the contact surface of the lens edge holding elements, which contact surface is in contact with the clamped optical lens, is formed in a V-shape in order to ensure a centering of the clamped optical lens in the lens holding device. In a further preferred embodiment, the V-shaped contact surface of the lens edge holding elements have a stepped shape in order to enable a better retention of the optical lens and avoid a slipping of the optical lens within the lens holding device.

The first, second, and third lens edge holding elements may respectively be formed either as one piece with the first and second lens holding unit and the third edge side, or be respectively attached to these, for example via laser welding.

The at least partially circumferential frame thereby lies parallel to the main plane of the optical lens, preferably in the main plane of the optical lens. The stability of the lens holder may hereby be increased.

In a further embodiment, the frame of the optical lens runs parallel to a plane that is defined by the edge of the optical lens. It is hereby possible to view the optical lens along an optical axis of the optical lens without the frame running before or behind the optical lens. This enables an inspection of the optical lens before and after the dip coating, whereby defects in the coating layer may be discovered and corrected as early as possible, in particular without the optical lens needing to be removed from the lens holding device for this purpose.

The third lens edge holding element is arranged at the frame, in a lower frame portion. In one embodiment, the third frame portion is planar in shape. Due to the surface tension of the dip coating solution, the surface of the lower frame portion supports a best possible draining of the dip coating solution from the optical lens, and contributes to the damping of waves on the surface of the dip coating solution.

The first and second lateral frame portion are designed to damp waves on the surface of the dip coating solution that are caused by the emergence of the first or second lens edge holding element. As has already been stated above, these waves may lead to inhomogeneities in the coating layer of the optical lens, or the coating layers of adjacent optical lenses which are dip-coated in parallel. This damping effect arises due to the surface of the first and second frame portion during the emergence, and therefore enables a homogeneous coating of the optical lens. In a further embodiment, the first and second frame portion respectively represent a damping portion with increased surface or, respectively, increased damping effect.

In a further embodiment, the first and second elastic lens holding unit are jointly designed to hold optical lenses of different sizes, whereas the at least partially circumferential frame remains unchanged given an installation of optical lenses of different size. Such a rigid or dimensionally stable frame enables a simple mechanical or automatic handling of the lens holding device, for example given placement, dipping process, monitoring, and/or further processing, independently of the respective size of the optical lens.

In a further embodiment, the first or the second elastic lens holding unit with the respective first or second lens edge holding element are designed so that, during the emergence from the dip coating bath, the optical lens is held vertically by the lens holding device such that a first and a second lateral retention point at which the optical lens is held by the first or second lens edge holding element are respectively located at a height in the range of approximately 0.4 to 0.6 times, preferably in a range of approximately 0.45 to 0.55 times, a diameter of the optical lens above the lower retention point. In this sense, the height is in particular measured along an axis that travels through the lowermost point which emerges from the dip coating solution as a last point of the optical lens upon emergence, and along an emergence direction. A particularly secure seating of the optical lens is ensured by such an embodiment of the first and second elastic lens holding unit. Moreover, the retention points therefore are laterally situated as widely as possible, which reduces an influence of waves that may arise upon emergence of the lens edge holding elements on the quality of the coating layer. In addition to this, such waves may therewith be particularly efficiently damped by the lateral frame segments.

In a further embodiment, a first clearance between the first lens edge holding element and the first lateral frame portion, and/or a second clearance between the second lens edge holding element and the second lateral frame portion, is not more than 22 mm, preferably not more than approximately 10 mm, even more preferably not more than approximately 5 mm, most preferably not more than approximately 2 mm, in particular while holding an optical lens. Such a clearance ensures a significantly advantageous damping effect of the first and second frame portion, wherein the damping effect decreases with a larger first or second clearance.

In a further embodiment of the lens holding device, the first and second elastic lens holding unit is respectively attached to an upper frame portion of the frame. A draining of the dip coating solution in a direction counter to the first or second emergence direction is hereby simplified. In addition to this, a webbing formation at the first or second lens holding unit is hindered and/or prevented. Within the scope of the present disclosure, it has thus been recognized that further limits of the coating layer quality may be caused by "webbing" effects. This is hereby the formation of a thin coating film or a thin coating skin of liquid dip coating solution that in particular spans completely enclosed surfaces of the lens holder, including the optical lens, during the emergence. The dip coating solution of these coating films continues to drain until the coating film becomes unstable and tears. Coating splatters or waves in the dip coating solution may hereby arise, which may lead to coating layer defects on the optical lenses. The coating splatters and/or waves on the dip coating solution may additionally lead to coating layer defects on adjacent optical lenses which are dip-coated in parallel. Therefore, it is advantageous to provide a lens holder which prevents the formation of webbing films, or limits their detrimental effects.

The first and second elastic lens holding unit is respectively attached to the frame at a corresponding attachment portion such that the lens holding device is configured to dip an optical lens held by said lens holding device entirely into a dip bath such that the attachment portion remains or may remain outside of the dip bath. The lens holding device is preferably designed such that the upper frame segment is not immersed into the dip bath.

By avoiding an immersion of the attachment portions into the dip bath, a formation of a coating skin may be prevented, and therefore the occurrence of webbing effects. Moreover, the attachment segment may have a surface on which dust may collect. A contamination of the dip coating solution may be avoided insofar as this attachment portion is not immersed into the dip bath.

In a further embodiment, the first and second lens edge holding element, in particular the first and second elastic lens holding unit, and/or the first and second lateral frame segment are arranged symmetrically with regard to a vertical plane of the lens holding device. In this sense, a vertical plane is in particular a plane whose normal vector is defined orthogonal to a normal vector of a plane that is defined by the lateral frame portions and travels orthogonal to a normal vector of a plane that is defined by the surface of the dip coating solution. Waves that arise on the surface of the dip coating solution are symmetrically damped by the lens edge holding elements or the elastic lens holding units and/or the lateral frame portions due to such a symmetrical arrangement of said lens edge holding elements or of said elastic lens holding units and/or of said lateral frame portions. A non-uniform damping of these waves is hereby avoided, whereby a homogeneous coating of the optical lens is enabled.

In a preferred embodiment, the first and/or second frame portion extends essentially orthogonal to the surface of the dip coating bath during an emergence. In other words, the first and/or second frame segment travels preferably parallel to a vertical axis of the lens holding device. In this sense, "essentially" means in particular that an angle between an axis of the first or second frame segment (or the vertical axis of the lens holding device) and the normal vector of the plane that is defined by the surface of the dip coating solution is not greater than approximately 10°, preferably not greater than approximately 5°, most preferably not greater than approximately 2°. This hereby has the effect that no bow waves, which may negatively affect the quality of the coating of the optical lens, are generated by the first and/or second frame portion upon emergence of the lens holding device from the dip coating bath.

In a further embodiment, the frame spans a frame plane, wherein the first, the second, and the third lens edge holding element extend predominantly in a common direction out of the plane of the frame. It is hereby achieved that, with the side opposite this common direction, the lens holding device may rest very well on a planar surface, and therefore may be very simply aligned again in the event of a possible deformation of the lens holding device. In a preferred embodiment, the frame and all elements of the lens holding device that are at least partially or entirely enclosed by the frame are arranged essentially on a common side of the plane of the frame. In this sense, "essentially" means with the exception of minimal projections that are necessary for the fabrication of the lens holding device, for example for the attachment via laser welding of the lens edge holding elements to the elastic lens holding units.

In a further embodiment, the lens holding device also comprises an attachment unit for attaching the lens holding device in a dip coating system for dipping the lens holding device in and out during the dip coating. In a preferred embodiment, the frame of the lens holding device comprises an attachment unit to magnetically attach the lens holding device in a dip coating system for dipping the lens holding device in and out during the dip coating. A flexible and variable mounting of the lens holding device in the dip coating system is hereby possible, wherein a clearance between adjacent lens holding devices that are mounted in the dip coating system is not firmly predetermined. Instead, it is possible to choose the clearance variably, for example depending on the respective thicknesses and/or curvatures of the held optical lenses. A very efficient use of the available space is therewith enabled while simultaneously ensuring a high coating layer quality given simultaneous coating of a plurality of optical lenses.

In a further embodiment, the lens holding device also comprises an encoding unit for machine-readable identification of said lens holding device, in particular in the form of a mechanically and/or optically and/or electrically and/or electromagnetically readable marking. For example, lens holding devices for different lens sizes may therewith be very simply detected automatically, which significantly simplifies an automatic placement and coating, for example. Beyond this, it is preferably even possible to be able to uniquely, preferably fully automatically, track single, individual optical lenses, for example spectacle lenses, during a coating process and possibly even a quality control. Furthermore, it is also possible—for example by means of RFID—to associate the coated lens uniquely with a transport tray and/or a job number, and/or even fully automatically place said coated lens back into the correct transport tray and/or reassociate the job or the job number together with the lens of an arbitrary transport tray.

In a preferred embodiment, the first, second, and/or third lens edge holding element is designed flat, with a width of at least approximately 10 mm, preferably at least approximately 13 mm, and a height in a range from approximately 7 mm to 15 mm, preferably in a range from approximately 10 mm to 12 mm Due to the large surface of the planar lens edge holding elements, a best possible drainage of the dip coating solution is advantageously ensured via the lens edge holding elements, whereby the formation of a homogeneous coating layer is supported. Furthermore, the formation of coating beads on the lens edge may also hereby be suppressed. This width thereby preferably extends orthogonal to a plane of the frame.

A further aspect of the disclosure relates to a lens holder set having a plurality of lens holding devices according to the disclosure, wherein the frames of the plurality of lens holding devices of the lens holder set conform, whereas the first and second elastic lens holding units of the plurality of lens holding devices differ at least in part to accommodate optical lenses of different sizes. The lens holding devices of the lens holder set may hereby have an arbitrary combination of the features disclosed for the lens holding devices according to the disclosure. Due to the conforming frame for the accommodation of optical lenses having different sizes, it is possible to provide a broadly applicable lens holder set that is simple to handle, and thus to increase the efficiency of a dip coating. In particular, different optical lenses may be very reliably mechanically processed partially or fully automatically, in particular be coated and checked, by means of the conforming frame.

An additional aspect of the present disclosure relates to a method for dip coating of an optical lens in a dip coating bath by means of a lens holding device according to the disclosure, wherein the optical lens is held vertically by the lens holding device during an emergence from the dip coating bath, such that the optical lens emerges last from the dip bath with a lower retention point at which the optical lens is held by the third lens edge holding element. The lens holding device may hereby have an arbitrary combination of the features disclosed for the lens holding devices according to the disclosure. An optical drainage of the dip coating solution from the optical lens is enabled via such a vertical retention of the optical lens, wherein the formation of coating flow lines, coating beads, and additional coating layer defects is avoided.

In a further embodiment, the optical lens is held vertically by the lens holding device during the emergence from the dip coating bath, such that a first and a second lateral retention point at which the optical lens is held by the first or, respectively, second lens edge holding element is respectively located at a height above the lower retention point within a range of approximately 0.4 to 0.6 times, preferably within a range of approximately 0.45 to 0.55 times, a diameter of the optical lens. A particularly good retention of the optical lens in the lens holding device is thereby ensured.

In a further embodiment, the lens holding device is held magnetically at a mounting rail of a dip coating system during a dip process. An efficient use of the available space on the mounting rail for lens holding devices is hereby ensured.

In a further embodiment, the method also includes an automatic readout of an encoding unit provided at the frame of the lens holding device to identify said lens holding device and/or the optical lens.

In a further embodiment, the method includes an optical review of a coating of the optical lens while the optical lens is held by the lens holding device and after it has emerged from the dip bath. The partially or entirely circumferential frame enables a simple handling of the optical lens after the emergence from the dip coating bath, without an unclamping of the optical lens from the lens holding device being necessary. Potential coating layer defects that may arise due to a direct handling of the optical lens are hereby avoided. The at least partially circumferential design of the lens holding device also allows an optical review of the optical lens without portions of the lens holding device covering optical paths through the optical lens. It is therewith possible to subject the optical lens to a complete optical inspection without the optical lens needing to be unclamped from the lens holding device.

A further embodiment relates to a method according to the disclosure for dip coating of a plurality of optical lenses, in particular optical lenses of different sizes, by means of a plurality of lens holding devices according to the disclosure of a lens holder set according to the disclosure, wherein during the emergence from the dip coating bath the lower retention points at which the optical lenses are held by the respective third lens edge holding element simultaneously emerge from the dip bath. Waves arise on the surface of the dip coating solution due to a tearing of said dip coating solution from the respective lower retention point of an optical lens of the plurality of optical lenses, which waves propagate and may lead to coating layer defects at adjacent optical lenses that have not yet completely emerged. The formation of such coating layer defects is prevented or reduced via a simultaneous emergence of the lower retention points of the plurality of optical lenses.

BRIEF DESCRIPTION OF THE DRAWINGS

The present disclosure is described in the following using preferred exemplary embodiments with reference to the accompanying drawings. Thereby shown are.

DETAILED DESCRIPTION

Figure 1:
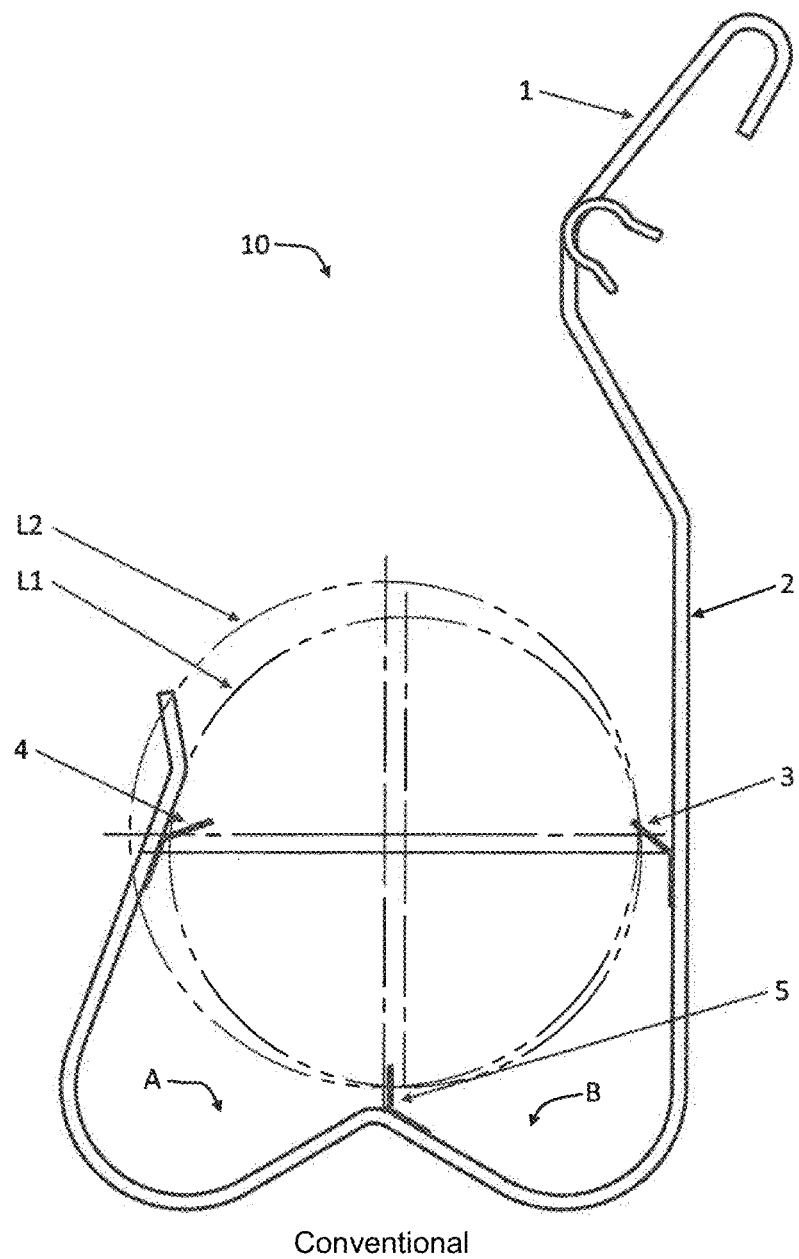
FIG. 1 shows a conventional lens holder for holding an optical lens.

FIG. 1 shows an example of a conventional lens holder 10 for holding an optical lens. The lens holder 10 comprises an attachment element 1 for attachment of the lens holder 10 during a dip coating process. The lens holder 10 also comprises a frame 2 that is not of closed design. A first, second, and third retention element 3, 4, 5 are arranged at the frame 2 in order to hold an optical lens L1, L2 in the lens holder 10.

Figure 2:
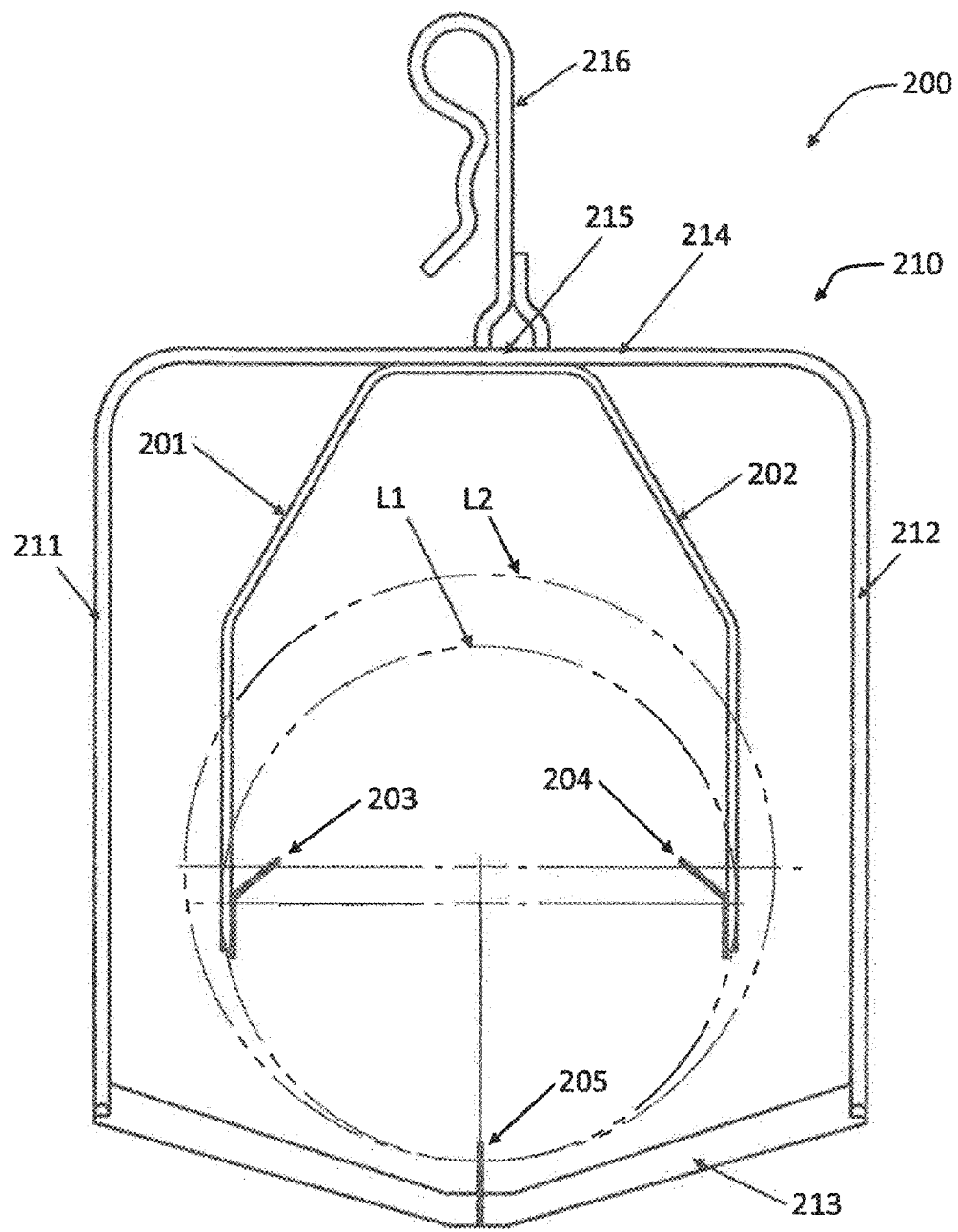
FIG. 2 shows an exemplary embodiment of a lens holding device according to the disclosure.

FIG. 2 shows an exemplary embodiment of a lens holding device 200 according to the disclosure. In this embodiment, the lens holding device 200 comprises a frame 210 that is of closed design and therefore exhibits an increased stability relative to vibrations of the frame 210, for example during a dip coating process. This promotes a homogeneous coating. The frame 210 comprises a first lateral frame portion 211 and a second lateral frame portion 212 that are connected with one another via an upper frame portion 214 and a lower frame portion 213.

In this embodiment, the lower frame portion 213 is of planar design. Due to a surface tension of the dip coating solution, a homogeneous drainage of said dip coating solution from an optical lens L1, L2 inserted into the lens holding device 200 is hereby assisted during an emergence of the optical lens L1, L2. The homogeneous draining enables a formation of a homogeneous coating layer on the optical lens L1, L2.

The lens holding device 200 additionally comprises a first elastic lens holding unit 201 and a second elastic lens holding unit 202 which are arranged at the frame 210 in an attachment portion 215 of an upper frame portion 214. In the example of a lens holding device 200, the first and second lens holding unit 201, 202 are formed as one part from a continuous component. At the first lens holding unit 201, a first lens edge holding element 203 is arranged which is designed to hold the edge of the optical lens L1, L2. At the second lens holding unit 202, a second lens edge holding element 204 is arranged which is designed to hold the edge of the optical lens L1, L2 essentially opposite the first lens edge holding element 203.

A third lens edge holding element 205 is also arranged at the lower frame portion 213, which third lens edge holding element 205 is designed to hold the optical lens L1, L2 at a lowermost point of an edge of the optical lens L1, L2. It is hereby ensured that potential coating beads that might form at the lowermost point during the emergence may drain via the third lens edge holding element 205. Via such an arrangement, it is possible to optionally clamp optical lenses L1, L2 with different diameters in the same lens holding device 200 without an alteration of the frame size hereby resulting, and wherein the lowermost point of the optical lens L1, L2 is held essentially by the third lens edge holding element 205.

In particular, the lens holding device is designed such that an optical lens L1, L2 that is inserted therein may be completely immersed in a dip coating bath while the upper frame portion 214, in particular the attachment portion 215 and upper ends of the lens holding units 201, 202, may remain outside of the dip coating bath. The formation of an unwanted coating skin upon emergence, which may occur given conventional lens holders 10 according to FIG. 1, may therewith be prevented.

As is apparent in comparison with the present disclosure, for example in FIG. 1, an enclosed surface A is defined by the held optical lens L1, L2, the frame 2, and the holding elements 4, 5. A second enclosed surface B is defined by the hold optical lens L1, L2, the frame 2, and the holding elements 3, 5. Both surfaces are entirely submerged upon dipping the optical lens into the dip coating bath. These surfaces of the lens holder are therefore susceptible to the formation of coating films which cover the areas A, B. These coating films arise during an emergence of the optical lens 10 from a dip coating solution. The dip coating solution hereby wets the surfaces A and B, whereby a thin, liquid coating film arises, also referred to as webbing. The liquid dip coating solution of the coating film continues to drain from the wetted surfaces A, B until the coating film becomes unstable and tears. This may lead to splattering of the dip coating solution, which may lead to coating layer defects on other optical lenses L1, L2 in adjacent lens holders 10. Additionally, waves on the dip coating solution may be generated by the abrupt tearing of the coating films, which waves may likewise cause coating layer defects at adjacent optical lenses.

In the exemplary embodiment of FIG. 2, the first and second lens holding unit 201, 202 are furthermore designed such that an elastic deformation up to a state with a greater mutual clearance of the first and second lens edge holding element 203, 304 leads to a greater clearance of the third lens edge holding element 205 from a straight connecting line between said first and second lens edge holding element 203, 204, or from a straight connecting line between the lateral retention points. In the depicted embodiment, this is achieved in particular in that the lateral lens holding units 201, 202 are connected with the upper frame portion, and therefore are essentially rigid, only in a central region that is narrower than the mutual clearance of the first and second lens edge holding element in the relaxed state (thus without a clamped optical lens), whereas they may otherwise deform elastically. With this it is achieved that, for blank round optical lenses (with circular circumference), the lateral retention points can be positioned relatively well in the region of the height of the center point of the lens even given different lens sizes. A secure retention of the optical lens L1, L2 in the lens holding device 200, and an optimal distribution of the lens edge holding elements 203, 204, 205 for homogeneous draining of the dip coating solution from the optical lens L1, L2, is hereby ensured.

The lens holding device 200 also comprises an attachment unit 216 for the attachment of the lens holding device 200 to a mounting rail of a dip coating system.

Figure 3:
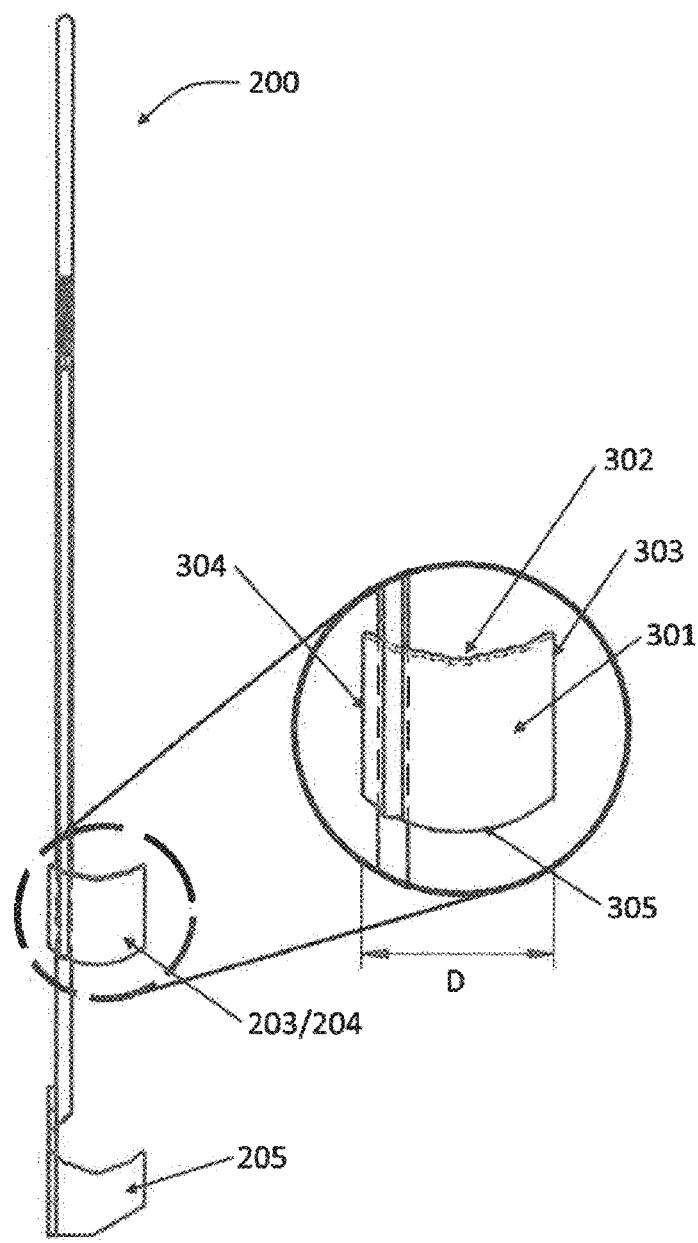
FIG. 3 shows a side view of a lens holding device according to the disclosure, and in particular the first/second lens edge holding element and the third lens edge holding element.

FIG. 3 shows a side view of the lens holding device 200, and in particular the first/second lens edge holding element 203/204 and the third lens edge holding element 205. The first/second lens edge holding element 203/204 is hereby planar in shape with width D, and has a transversal area 301 that, due to a surface tension of the dip coating solution, enables a homogeneous draining of said dip coating solution from an optical lens via the first/second lens edge holding element 203/204 during an emergence. The first/second lens edge holding element 203/204 also has a V-shaped recess 302 which is designed to hold the edge of an optical lens and to center said optical lens in said first/second lens edge holding element 203/204. The V-shaped recess is hereby additionally formed with steps in order to ensure a secure retention of the optical lens and prevent a slippage of the optical lens in the lens holding device 200.

Sides 303 and 304 of the first/second lens edge holding element 203/204 travel parallel to an emergence direction of the optical lens from the dip coating bath in order to prevent the formation of surface waves on said dip coating bath. The rounded side 305 is thereby designed to avoid an abrupt emergence of the first/second lens edge holding element 203/204, wherein additional surface waves might arise. Instead of this, the rounded side 305 enables a gradual emergence of the first/second lens edge holding element 203/204.

FIG. 3 also clarifies that all components of the lens holding device 200 are arranged essentially on one side of a plane that is spanned by the frame 210. Given a possible deformation of the lens holding device, this enables a simple alignment of the deformed components to be performed, for example in that the lens holding device 200 is pressed against a flat surface.

Figure 4:
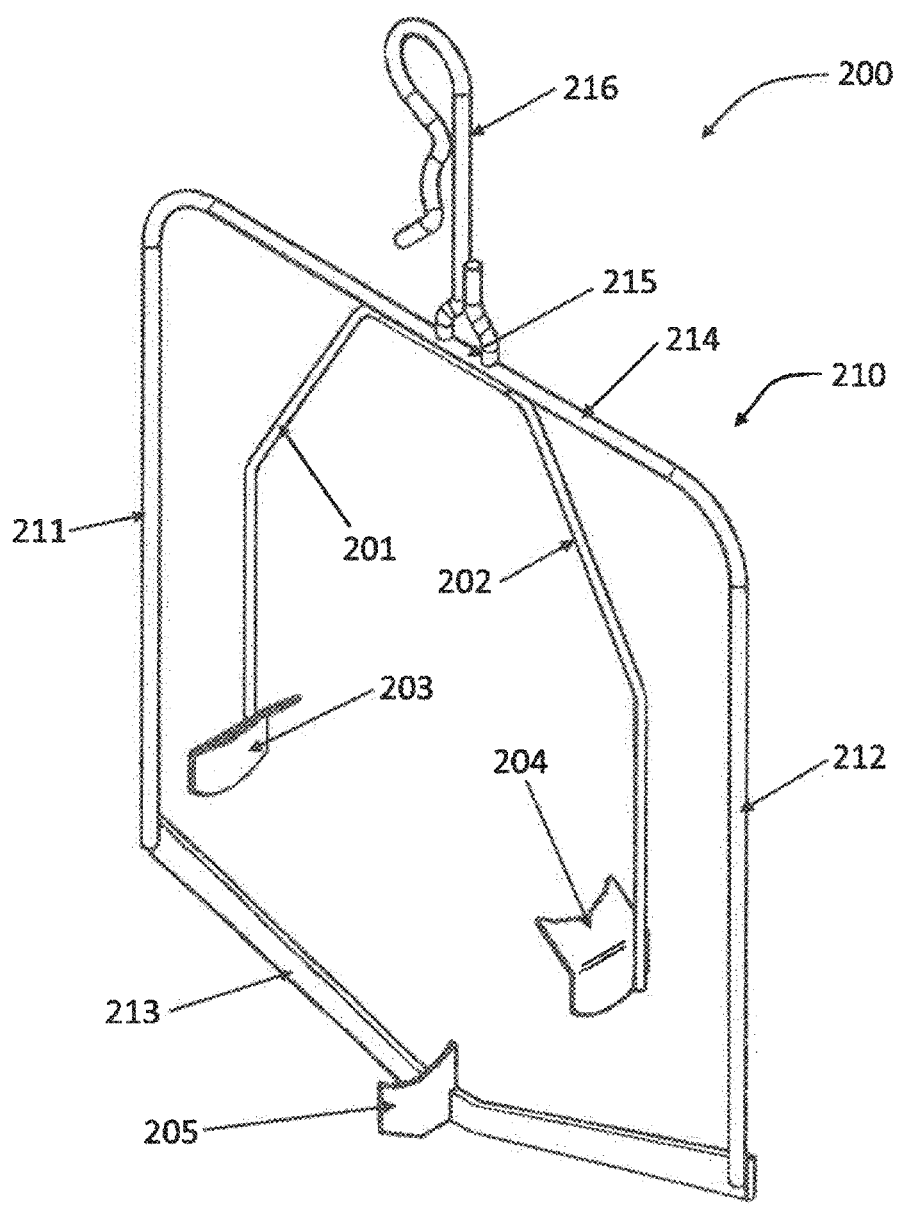
FIG. 4 shows a perspective view of a lens holding device according to the disclosure.
Figure 5:
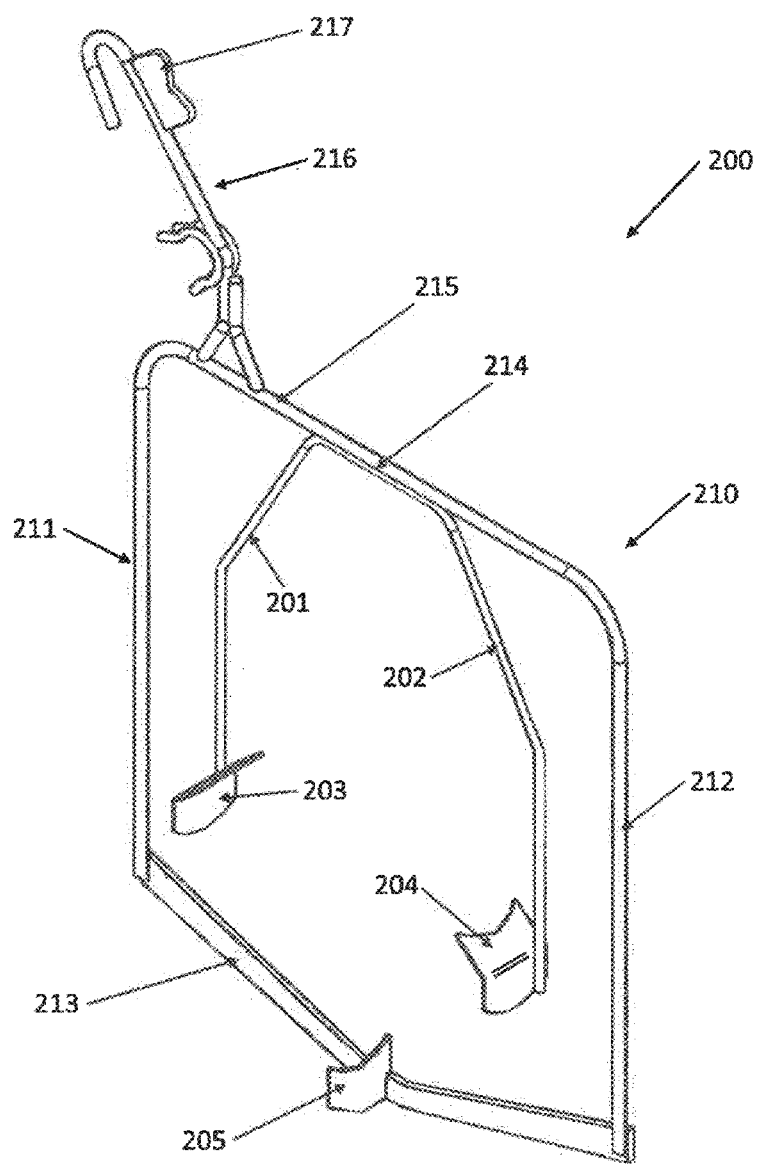
FIG. 5 shows a further embodiment of a lens holding device according to the disclosure.

FIG. 4 shows a perspective view of the lens holding device 200. FIG. 5 shows a further embodiment of a lens holding device 200 according to the disclosure which differs from the lens holding device 200 from FIG. 4 via a modified arrangement of the attachment unit 216. In particular, the attachment unit 216 is arranged laterally at the upper frame portion 215. The attachment unit 216 also comprises an encoding unit 217 for machine-readable identification of the lens holding device, in the form of a mechanically and/or optically and/or electrically and/or electromagnetically readable marking. The lens holding device 200 may therefore be very simply recognized automatically.

The present disclosure and its aspects are not limited to the aforementioned combinations of features. Rather, the person skilled in the art may, at their discretion, produce an arbitrary combination of the disclosed features of the aspects, embodiments, and Figures with the technical advantages linked therewith.

REFERENCE LIST 10 lens holder
1 attachment element
2 frame
3 first holding element
4 second holding element
5 third holding element
L1, L2 optical lens
A first enclosed surface
B second enclosed surface
200 lens holding device
201 first lens holding unit
202 second lens holding unit
203 first lens edge holding element
204 second lens edge holding element
205 third lens edge holding element
210 frame
211 first lateral frame portion
212 second lateral frame portion
213 lower frame portion
214 upper frame portion
215 attachment portion
216 attachment unit
217 encoding unit
D width
301 transversal area
302 V-shaped recess
303, 304 sides
305 rounded side

The invention claimed is:

1. A lens holding device for holding an optical lens at an edge, during a dip coating in a dip coating bath containing dip coating solution, comprising:
a first elastic lens holder with a first lens edge holder configured to hold the optical lens at the edge of the optical lens, on a first edge side, during the dip coating;
a second elastic lens holder with a second lens edge holder configured to hold the optical lens at the edge of the optical lens, on a second edge side, during the dip coating; and an at least partially circumferential frame with a third lens edge holder configured to hold the optical lens at the edge of the optical lens, on a third edge side, during the dip coating, wherein the first edge side and the second edge side are respectively arranged at a left side and a right side of the edge of the optical lens, wherein the third edge side is arranged on a lower side of the edge of the optical lens, wherein the at least partially circumferential frame comprises (i) a first lateral frame portion, and (ii) a second lateral frame portion, such that when the lens holding device is raised out of the dip coating bath, waves in the dip coating solution caused at a surface of the dip coating bath are thereby damped by the first lens edge holder and/or the second lens edge holder, and wherein a first clearance between the first lens edge holder and the first lateral frame portion, and/or a second clearance between the second lens edge holder and the second lateral frame portion, is not more than 22 mm.

2. The lens holding device according to claim 1, wherein the first and second elastic lens holder are jointly designed to hold optical lenses of different sizes, and wherein the at least partially circumferential frame remains unchanged given a mounting of optical lenses of different sizes.

3. The lens holding device according to claim 1, wherein the first clearance between the first lens edge holder and the first lateral frame portion, and/or the second clearance between the second lens edge holder and the second lateral frame portion, is not more than approximately 10 mm.

4. The lens holding device according to claim 3, wherein the first clearance between the first lens edge holder and the first lateral frame portion, and/or the second clearance between the second lens edge holder and the second lateral frame portion, is not more than 5 mm.

5. The lens holding device according to claim 4, wherein the first clearance between the first lens edge holder and the first lateral frame portion, and/or the second clearance between the second lens edge holder and the second lateral frame portion, is not more than 2 mm.

6. The lens holding device according to claim 1, wherein the first and second elastic lens holders are respectively attached at an upper frame portion of the frame.

7. The lens holding device according to claim 1, wherein the first and second elastic lens holders are respectively attached to the at least partially circumferential frame in a corresponding attachment portion such that the lens holding device is configured to submerge an optical lens held by the lens holding device entirely into a dip bath while the corresponding attachment portion remains outside of the dip bath.

8. The lens holding device according to claim 1, wherein the first and second lens edge holder, the first and second elastic lens holder, or the first and second lateral frame portion are arranged symmetrically relative to a vertical plane of the lens holding device.

9. The lens holding device according to claim 1, wherein the at least partially circumferential frame spans a plane of the at least partially circumferential frame, and wherein the first, second, and third lens edge holders extend predominantly in a direction out of the plane of the at least partially circumferential frame.

10. The lens holding device according to claim 1, wherein the at least partially circumferential frame comprises an attachment configured to magnetically attach the lens holding device in a dip coating system for dipping the lens holding device in and out during the dip coating.

11. The lens holding device according to claim 1, further comprising:

an encoder configured to machine-readably identify the lens holding device via a mechanical, optical, electrical, or electromagnetic marking.

12. The lens holding device according to claim 1, wherein the first, second, and third lens edge holders are planar in shape, with a width of at least 10 mm.

13. The lens holding device according to claim 12, wherein the first, second, and third lens edge holders are planar in shape, with a width of at least 13 mm.

14. The lens holding device according to claim 13, wherein the first, second, and third lens edge holders are planar in shape, with height in a range of between 7 mm to 15 mm.

15. The lens holding device according to claim 14, wherein the first, second, and third lens edge holders are planar in shape, with a height in a range of between 10 mm to 12 mm.

16. The lens holding device according to claim 1, wherein the lens holding device is part of a lens holder set comprising a plurality of lens holding devices, wherein respective at least partially circumferential frames of each of the plurality of lens holding device of the lens holder set conform with one another, wherein respective first and second elastic lens holders of each of the plurality of lens holding device at least partially differ from one another to accommodate optical lenses of different sizes.

\* \* \* \* \*